(12) United States Patent
Irven et al.

(10) Patent No.: US 6,572,688 B2
(45) Date of Patent: Jun. 3, 2003

(54) GAS PURIFICATION UNIT

(75) Inventors: John Irven, High Wycombe (GB); Graham Alan Leggett, Hampton (GB); Jonathan Davey, Guildford (GB); Dao-Hong Zheng, London (GB)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 10/060,984

(22) Filed: Jan. 30, 2002

(65) Prior Publication Data

US 2002/0112608 A1 Aug. 22, 2002

(30) Foreign Application Priority Data

Feb. 15, 2001 (GB) .............................................. 0103762

(51) Int. Cl.$^7$ ............................................... B01D 53/04
(52) U.S. Cl. ......................... 96/135; 96/154; 55/385.4; 55/417; 222/189.06
(58) Field of Search .......................... 96/134, 135, 138, 96/147, 154, 151; 55/385.4, 417, 418, 478; 220/560.04; 222/189.06

(56) References Cited

U.S. PATENT DOCUMENTS

| | | | | |
|---|---|---|---|---|
| 2,846,021 A | * | 8/1958 | Encinas | 96/151 |
| 4,032,311 A | * | 6/1977 | Bohmrich et al. | 55/385.4 |
| 4,483,461 A | * | 11/1984 | Igarashi | 222/3 |
| 5,403,387 A | | 4/1995 | Flynn et al. | 96/143 |
| 5,409,526 A | | 4/1995 | Zheng et al. | 96/132 |
| 5,910,291 A | * | 6/1999 | Skalla et al. | 422/171 |
| 5,980,599 A | * | 11/1999 | Chris et al. | 55/312 |
| 6,245,553 B1 | * | 6/2001 | Keyser | 435/266 |

FOREIGN PATENT DOCUMENTS

| | | |
|---|---|---|
| EP | 0916891 | 3/1909 |
| EP | 0288931 | 11/1988 |

* cited by examiner

Primary Examiner—David A. Simmons
Assistant Examiner—Frank M. Lawrence
(74) Attorney, Agent, or Firm—Geoffrey L. Chase

(57) ABSTRACT

Gas is admitted to an in-container purification unit 202 via an inlet 212 located at or near the gas discharge end 220 of the unit. This feature is advantageous because it allows a liquefied gas container to be filled to a level above the second end of the body of the unit without the problem of dispensing liquefied gas.

14 Claims, 5 Drawing Sheets

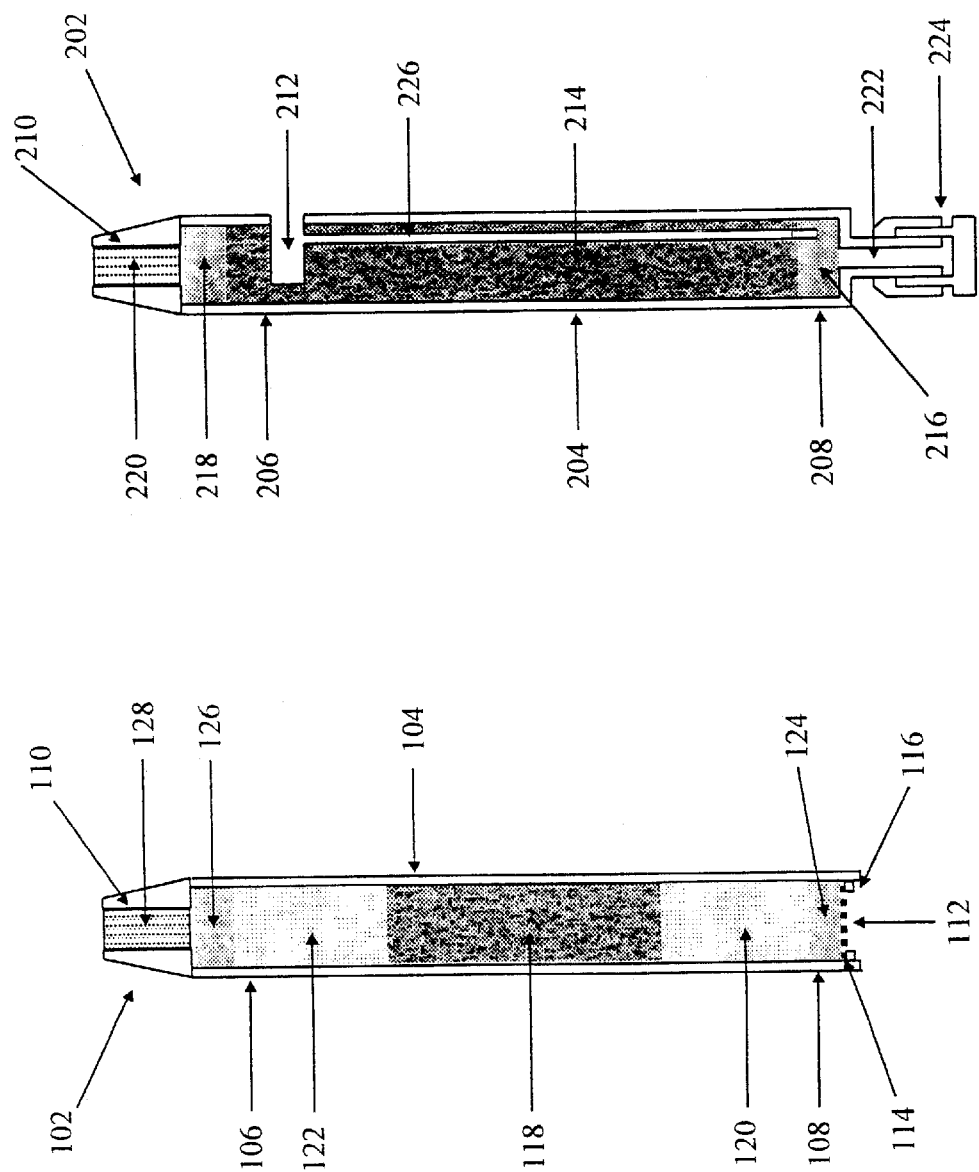

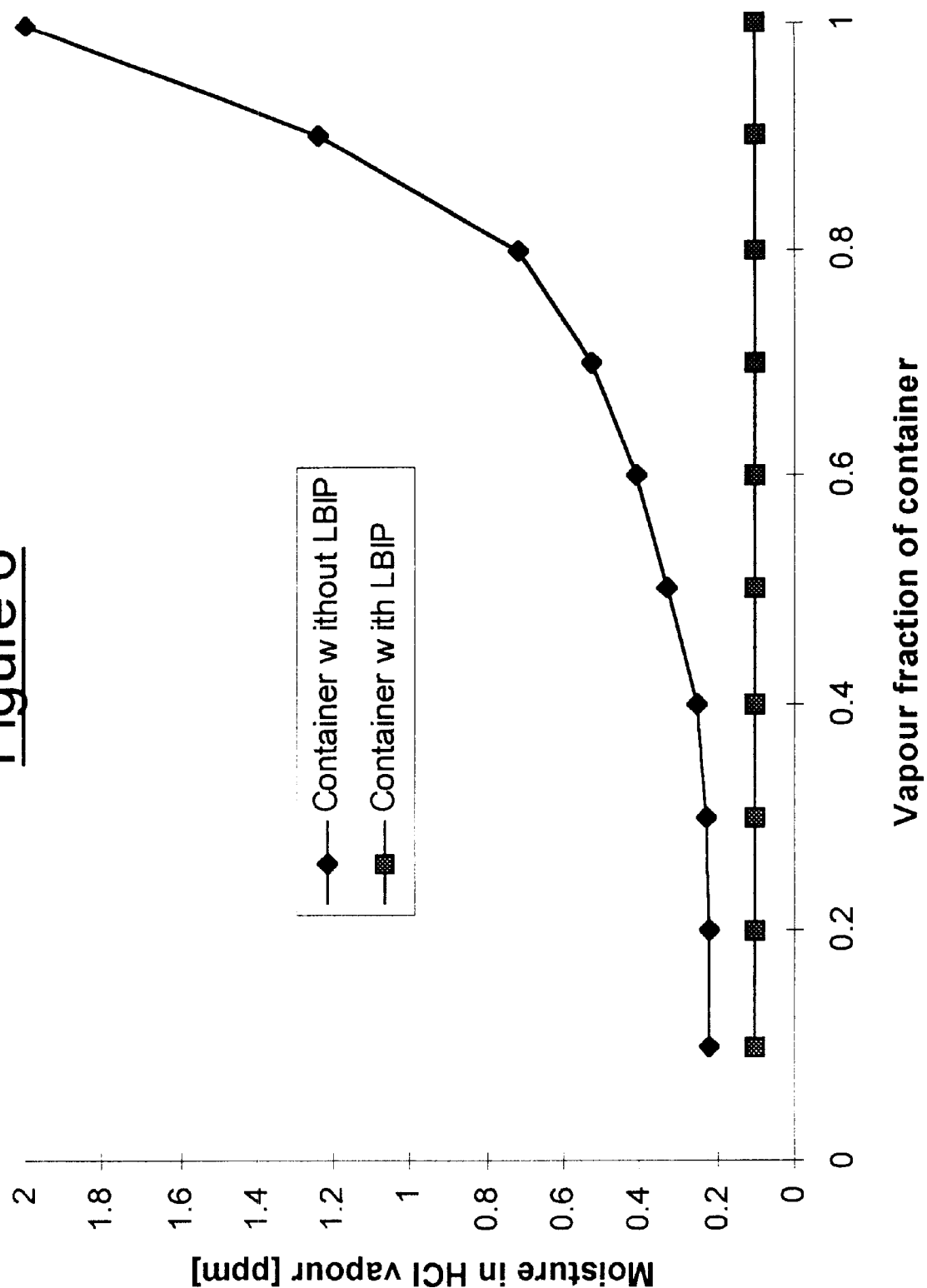

GAS PURIFICATION UNIT

BACKGROUND OF THE INVENTION

The present invention relates to a gas purification unit. In particular, the present invention relates to a gas purification unit for purifying a gas before said gas is dispensed from a liquefied gas container such as a cylinder.

Many commercial processes, particularly in the electronics and semi-conductor industries, require high purity gases and gas mixtures, i.e. gases and gas mixtures that are substantially free from one or more unwanted components ("impurities"). In many applications, the high purity gases and gas mixtures must contain less than a total of 50 parts per million ("ppm") nitrogen, oxygen, carbon monoxide, carbon dioxide, hydrocarbon compounds and water. In other applications, the only requirement may be that the high purity gas or gas mixture contains less than a few ppm of a specific impurity, for example water. In certain cases, an unacceptable level of impurities may be of the order of several parts per billion ($10^9$) ("ppb").

Moisture is recognized by the semiconductor industry as a key impurity, the presence of which has a direct impact on the yield of semiconductor devices. It is also generally acknowledged as the most difficult impurity to remove effectively from gas distribution systems. The industry trend is moving towards larger semiconductor wafer diameters which in turn will lead to lower process pressures and gas flows. Under these conditions, the moisture adsorbed on to the inner surfaces of the processing equipment is readily desorbed into the gas stream affecting the performance of the semiconductor manufacturing process.

Corrosive gases used in semiconductor manufacturing processes, particularly hydrogen chloride ("HCl"), are often sources of moisture contamination. HCl supplied in containers for use in semiconductor manufacturing applications has a moisture specification of 1 ppm (VLSI grade) or 2 ppm (electronic grade). It is at high pressure in liquid form as supplied. As it is consumed, the liquid HCl boils off to form the gaseous HCl which is supplied to the process. After most of the liquid has evaporated, the last few percent of liquid and gas remaining is known as the 'heel'. While the bulk of the contents of the container will meet the moisture specification, there is a significant increase in the moisture concentration as the container heel is used and this moisture specification may well be exceeded which could have a significant and adverse effect on the semiconductor manufacturing process. FIG. 6 depicts how the measured moisture concentration increases as the container heel is used.

One way of tackling moisture contamination from a gas is to remove moisture from the gas at the point of use ("POU") of the gas.

U.S. Pat. No. 5,403,387 (Flynn et al; published on Apr. 4, 1995) discloses a device for removing moisture from a flow of gas to provide air or other gases having relatively low humidity. The device comprises an elongated housing and a connection head which together form a canister. The connection head defines a gas inlet, a gas outlet and a closure surface. The gas inlet is connected to a distribution tube that extends towards the bottom of the interior of the canister. A desiccant material, preferably one which can be rejuvenated by baking, e.g. silica gel, is provided within the housing around the distribution tube. Gas travels into the housing via the gas inlet and the distribution tube, passes through the desiccant material where it is dried and then leaves the device via the gas outlet. The device is designed to be used outside a container of the gas to be dried. In the only exemplified application, the device is used to dry a compressed air supply for a spray painting process.

EP-A-0288931 (Glenn; published on Nov. 2, 1988) discloses a valve block that is joinable to a receptacle to form a container suitable for use in the semiconductor industry primarily for liquid storage/vapour dispensing but also for gas purification applications. The valve block is characterised by having a triple valve configuration that permits dead space gases to be readily purged from a gas distribution system by an integral purge by-pass loop. In gas purification applications, the container is filled with a sorbent material which, in the only example provided, is an arsine scavenger. A dip tube extends downwardly from the valve block to direct the gas to be purified to the bottom of the sorbent material bed. The gas travels through the sorbent material and exits the container via a valve in the valve block. For all applications, the container is located outside the gas container containing the gas to be purified.

U.S. Pat. No. 5,409,526 (Zheng et al; published on Apr. 25, 1995) discloses apparatus for supplying high purity gas comprising a container having a valve with two internal ports. One internal port is used to fill the container while the other is fitted with a gas purification unit that extends into the container and which removes particulates and impurities from the gas as it leaves the container.

An example of the type of gas purification unit disclosed in Zheng is shown in FIG. 1. The unit 102 comprises a tubular body 104 having a first end 106 and a second end 108. The first end 106 has a gas outlet 110 that is adapted for connection to a valve and the second end 108 has a gas inlet 112. The unit 102 further comprises a filter disc 114 adjacent the inlet that is held in place with a circlip 116. Purification of the gas is provided by the combination of a layer 118 of an adsorbent material sandwiched between two layers 120, 122 of molecular sieves. This combination of layers is held between two plugs 124, 126 of glass wool. The gas outlet 110 is provided with a stainless steel filter 128.

In use, gas enters the unit 102 through the mouth of the gas inlet 112 at the bottom of the unit. The gas passes through the filter disc 114, the first glass wool plug 124, the various layers 118, 120, 122 of purifying material, the second glass wool plug 126 and the steel filter 128 and exits through the gas outlet 110 at the top of the unit whereupon it leaves the container via the valve assembly.

In EP-A-0916891 (Zheng et al; published on May 19, 1999), there is disclosed a gas control device for use with a container of compressed gas. The gas control device may comprise a purifier unit that is located within the container. It is disclosed that the purifier unit may conveniently be as described in U.S. Pat. No. 5,409,526.

Although this arrangement works well with permanent gases, there are several disadvantages associated with the gas purification unit disclosed in Zheng when working with liquefied gases. One of these disadvantages is that if the level of liquefied gas within a container is above the mouth of the gas inlet, the unit would act as a dip tube and allow liquefied gas to escape from the container.

FIG. 5a depicts a gas purification unit 502a of the type shown in FIG. 1 in situ attached to a valve assembly 506a mounted on a liquefied gas container 504a. The valve assembly includes internal pressure regulation. The inlet 512a is located at the lower end of the unit 502a and, thus, if the lower end of the unit is submerged in the liquefied gas, then liquefied gas is drawn from the container 504a. Liquefied gas withdrawn in this way could cause unwanted and possibly dangerous flooding of the gas distribution system. Such flooding would effect productivity not only by possibly ruining a batch of articles under production but also by requiring costly and time consuming clean up. The downtime of the process apparatus during clean up could have a significant effect on productivity.

These problems may be overcome by ensuring that the level of liquefied gas in the container is not higher than the mouth of the gas inlet of the purification unit. This can be achieved by partially filling the container thereby requiring use of a larger container if the same amount of liquefied gas is to be stored.

However, solutions of this type may not be cost effective. Partially filling a container means that the container needs to be replaced sooner (thereby increasing transportation costs and process apparatus downtime, etc.) and using a larger container would be wasteful and inefficient. As a conventional gas purification unit can extend a significant fraction of the length of the liquefied gas container, a significant of the container will be empty.

It is the primary object of the present invention to provide a gas purification unit that can be used with conventional liquefied gas containers that overcomes the above-mentioned problems without incurring any significant cost penalties.

BRIEF SUMMARY OF THE INVENTION

In a first aspect of the present invention, there is provided a gas purification unit suitable for purifying a gas before said gas is dispensed from a liquefied gas container having a valve assembly for discharging gas from the container, said unit comprising:
  a hollow body having a first end and a second end and being at least partially filled between said ends with gas purifying material;
  a gas outlet provided at the first end of the body and adapted for connection to said valve assembly so that the body extends into the container; and
  gas inlet means permitting gas flow from the container to the second end of the body,
  wherein the second end of the body is closed and the gas inlet means comprises conduit means having a mouth at or near the first end of the body.

BRIEF DESCRIPTION OF SEVERAL VIEWS OF THE DRAWINGS

FIG. 1 is a cross-sectional representation of a gas purification unit known in the art;

FIG. 2 is a cross-sectional representation of a first embodiment of the present invention comprising a Swagelok cap;

FIG. 4a is an expanded partial view of the present invention depicted in FIG. 4.

FIG. 6 is a graph depicting the change in moisture concentration (ppm) in HCl vapor as a function of the vapor fraction of the container for a container without the gas purification unit and for a container with the gas purification unit.

DETAILED DESCRIPTION OF THE INVENTION

Figure 3:
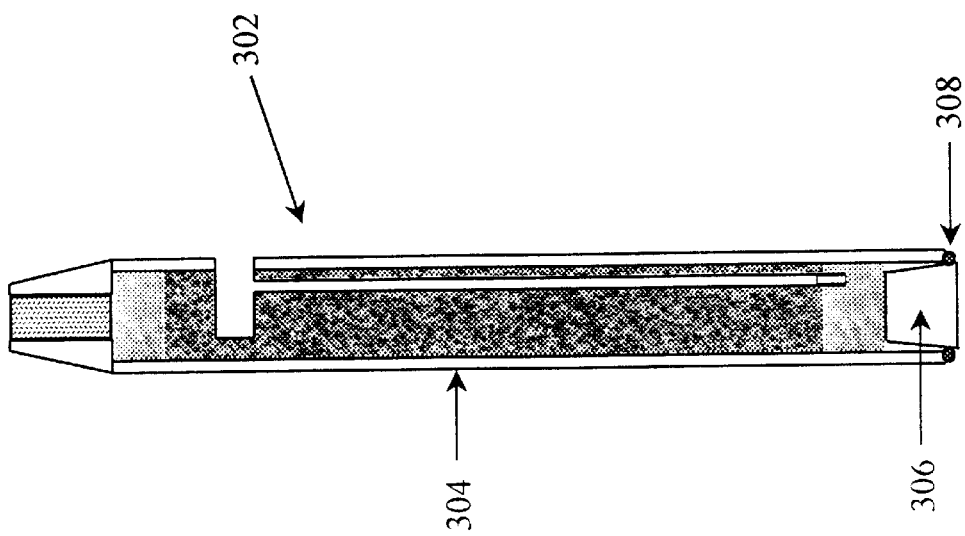
FIG. 3 is a cross-sectional representation of a second embodiment of the present invention comprising a tapered impact fitting.

The invention relates to a gas purification unit suitable for purifying a gas before said gas is dispensed from a liquefied gas container having a valve assembly for discharging gas from the container. The unit comprises a hollow body having a first end and a second end and being at least partially filled between said ends with gas purifying material. A gas outlet is provided at the first end of the body and adapted for connection to said valve assembly so that the body extends into the container. In addition, the unit comprises gas inlet means permitting of gas flow from the container to the second end of the body. The characterising feature of the invention is that the second end of the body is closed and the gas inlet means comprises conduit means having a mouth at or near the first end of the body.

Provided the level of the liquefied gas in the container does not exceed the level of the mouth of the gas inlet at or near the first end of the body of the unit, then the unit may be partially submerged in liquefied gas with no ill effect.

The conduit means may extend outside the body of the unit but, preferably, the conduit means is within the body of the unit. Gas purifying material may be provided within the conduit means but preferably the conduit means is devoid of gas purifying material.

The gas purification unit may further comprise a closable material filling port by means of which the body is filled with gas purifying material. Preferably, once the body is filled, the filling port is closed to seal the second end of the body. The filling port may be closed with a Swagelok™ cap or with a tapered impact fitting.

Preferably, the unit is capable of purifying gas to a high purity. For example, in a preferred embodiment, the present invention is capable of reducing the moisture concentration in HCl from single figure ppm to a level of approximately 0.1 ppm.

The purifying material may be any material suitable for removing impurities present in the particular gas or mixture of gases being dispensed from the container. The material may be an absorbent or an adsorbent or a combination thereof. The adsorbent may be a zeolite or molecular sieve, particularly 4A molecular sieves. The absorbent may comprise a chemical for removing impurities (a "getter") and/or a metal-organic compound. The purifying material may also comprise a catalyst to enhance the operation of the adsorbent or the adsorbent.

It is particularly preferred that the purifying material removes water from the gas. The purifying material preferably comprises magnesium chloride on a suitable inert support. Alumina may be used as the support but an amorphous carbon support is particularly preferred such as that disclosed U.S. Pat. No. 5,958,356 (Dong et al).

It is to be understood that the present invention may be used to purify any gas provided a suitable purifying material is used in the body of the unit. However, the present invention is preferably used when the gas to be purified is corrosive and in particular when that gas is HCl. In this case, it is preferred that where appropriate, the components of the unit are made from 316L stainless steel. For even more corrosive gases, materials such as Hastelloy™ (manufactured by Haynes Stellite, 1929) may be required.

The unit may further comprise at least one filter for particulate material. Suitable filters include sintered filter discs, glass wool and stainless steel filters.

In a second aspect of the present invention, there is provided a valve assembly for the outlet of a liquefied gas container, said valve assembly comprising a valve housing for mounting said assembly in the container outlet, at least one gas flow path through the housing, a valve controlling gas flow through said path and a gas purification unit up stream of said gas flow path to purify gas admitted to said path from the container, said unit being as defined in the first aspect of the present invention.

The valve assembly may comprise any of the optional features of the gas purification unit as described above, either alone or in any combination. The pressure of the gas to be dispensed can be regulated using a pressure regulator. Pressure regulation can provide pressure reduction from a higher value in the container to a lower value on the downstream side. If an absolute pressure regulator is employed, this can be set to a value such that gas is not delivered via the regulator until the pressure in the outlet line is reduced to a sub-atmospheric level.

In a third aspect of the present invention, there is provided a liquefied gas container system comprising a liquefied gas container having an outlet and a valve assembly mounted in the outlet of the container to control discharge of gas therethrough, said valve assembly being as defined in the second aspect of the present invention.

The liquefied gas container may comprise any of the optional features of the gas purification unit as described above, either alone or in any combination.

Referring to FIG. 2, the gas purification unit 202 comprises a tubular body 204 having a first end 206 and a second end 208. The first end 206 has a gas outlet 210 that is adapted for connection to a valve. The unit 202 also has a gas inlet 212. Purification of the gas is provided by a layer 214 of magnesium chloride on an amorphous carbon support. This layer 214 is held between two plugs 216, 218 of glass wool. The gas outlet 210 is provided with a stainless steel filter 220. The unit is provided with a filling port 222 that is capped with a Swagelok™ cap 224.

The mouth of the gas inlet 212 is provided at the first end 206 of the body 204. The gas inlet 212 then extends via conduit means 226 to the second end 208 of the body 204 where it terminates within the glass wool plug 216.

In use, gas enters the unit 202 via the mouth of the gas inlet 212 at the first end 206 of the body and is directed via the conduit means 226 to the second end 208 of the body. The gas then flows through the layer 214 of gas purifying material ($MgCl_2$ on amorphous carbon) and out of the unit via the stainless steel filter 220 located in the outlet 210. The flow of gas is shown in FIG. 4.

The unit 302 depicted in FIG. 3 differs only from the unit 202 depicted in FIG. 2 in that the material filling port is the open end of the body 304 and the Swagelok cap 224 has been replaced with a tapered impact fitting 306 welded 308 in position.

Figure 4:
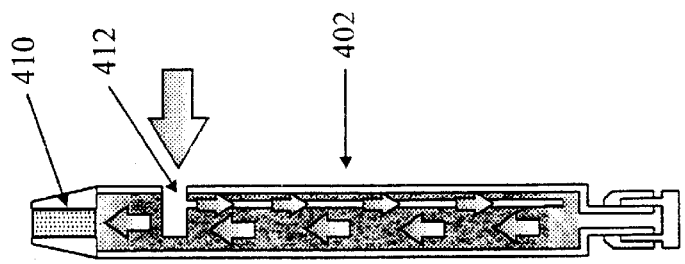
FIG. 4 is a cross-sectional diagrammatic representation of the first embodiment of the present invention depicted in FIG. 2 in use in combination with a liquefied gas container system.
Figure 4:
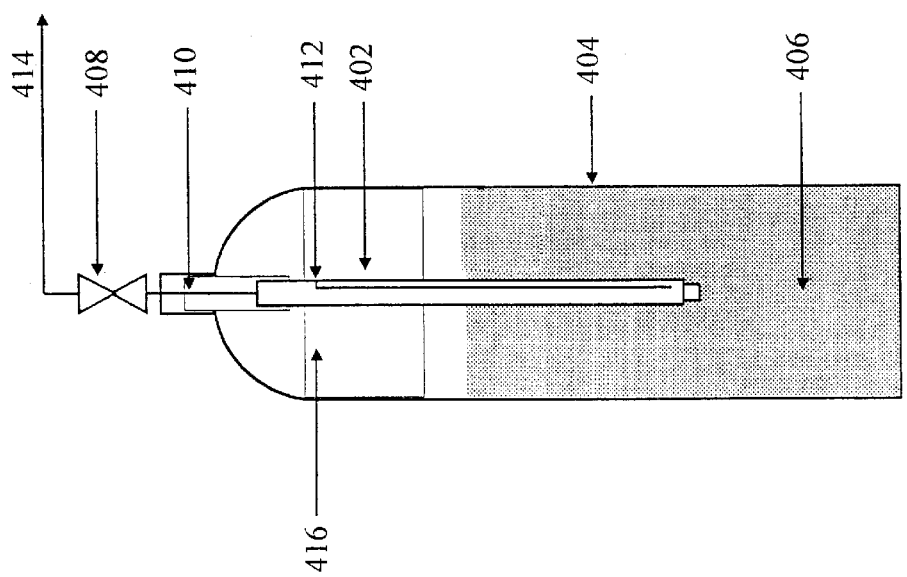

The gas purification unit 402 shown in FIG. 4 is identical to that shown in FIG. 2 with the arrows depicting the flow of gas through the unit. The unit is located within a container 404 of liquefied gas. The gas outlet 410 of the unit 402 is connected to a valve assembly 408 which in turn is in gas flow communication with a gas distribution system 414. This figure clearly shows how the mouth of the gas inlet 412 is above the level of the liquid phase 406 of the gas even when the lower of the unit is submerged beneath the interface between the gaseous phase 416 and the liquid phase 406. In this example, the liquefied gas is HCl.

Figure 5B:
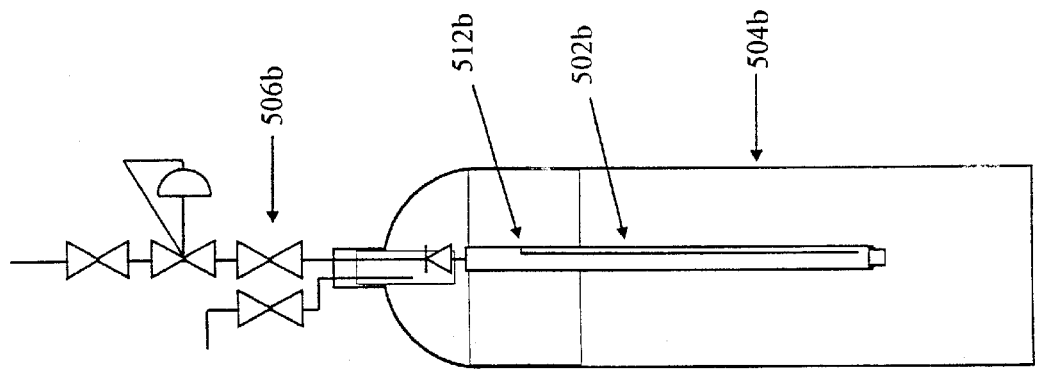
FIG. 5b is a cross-sectional representation of a gas purification unit according to the present invention in situ with a valve assembly mounted on a liquefied gas container.
Figure 5A:
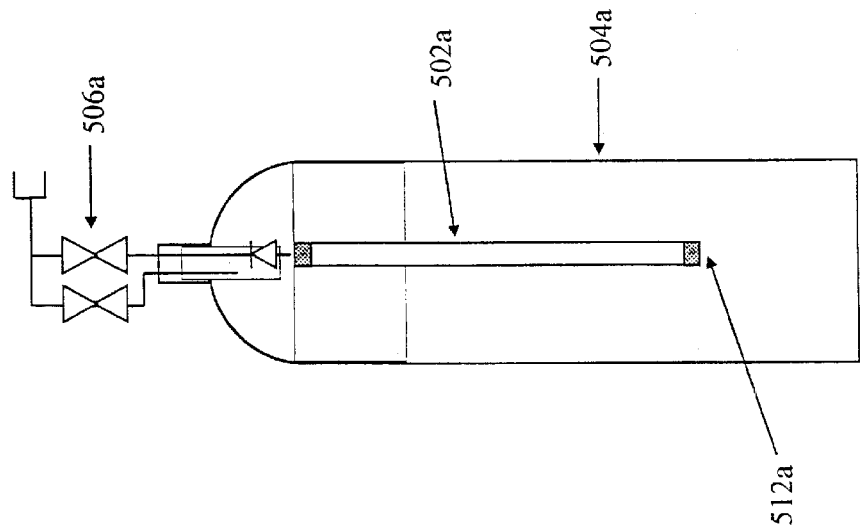
FIG. 5a is a cross-sectional representation of a gas purification unit known in the art in situ with a valve assembly mounted on a liquefied gas container.

Referring to FIG. 5b, a gas purification unit 502b according to the present invention is located in situ attached to a valve assembly 506b mounted on a liquefied gas container 504b. The valve assembly 506b includes internal pressure regulation. The inlet 512b is located at the upper end of the unit 502b and, thus, the body of the unit 502b can be submerged in the liquefied gas up to any level below the inlet 512b without liquefied gas being drawn into the unit. The maximum practical fill level of the container 504b is, therefore, greater than that for the container 504a shown in FIG. 5a.

The graph in FIG. 6 shows that the concentration of moisture in HCl vapour may be maintained at the low level of about 0.1 ppm using a gas purification unit (labelled in the Figure as "LBIP") according to the present invention even when dispensing the heel portion of the gas. In contrast, the moisture concentration in the heel portion of HCl reaches about 2.0 ppm if the gas is dispensed without using a gas purification unit.

An additional advantage of the present invention is that it may be activated before use using a standard activation rig with only slight modifications to the rig being necessary in order to provide pipework for an alternative inlet for a purge gas. The liquefied gas container would be prepared and filled in the same manner as a standard container and the system would operate in the same way at the POU.

The unit of the present invention ensures that impurity specification is met for the entire contents of the container. It also ensures that the quality of the gas is consistent from container to container.

It will be appreciated that the invention is not restricted to the details described above with reference to the preferred embodiments but that numerous modifications and variations can be made without departing from the spirit or scope of the invention as defined in the following claims.

What is claimed is:

1. A gas purification unit suitable for purifying a gas before said gas is dispensed from a liquefied gas container having a valve assembly for discharging gas from the container, said unit comprising:

a hollow body having a first end and a second end and being at least partially filled between said ends with gas purifying material;

a gas outlet provided at the first end of the body and adapted for connection to said valve assembly so that the body extends into the container; and gas inlet means permitting of gas flow from the container to the second end of the body, wherein the second end of the body is closed and the gas inlet means comprises conduit means having a mouth at or near the first end of the body.

2. The unit according to claim 1, wherein said conduit means is within the body of the unit.

3. The unit according to claim 1, wherein said conduit means is devoid of gas purifying material.

4. The unit according to claim 1 further comprising a closable material filling port by means of which the body is filled with gas purifying material.

5. The unit according to claim 4, wherein the filling port is closed to seal the second end of the body once the body is filled with gas purifying material.

6. The unit according to claim 4, wherein the material filling port is closed with a tapered impact fitting.

7. The unit according to claim 1, wherein the unit is capable of purifying gas to a high purity.

8. The unit according to claim 1, wherein the purifying material is magnesium chloride on an amorphous carbon support.

9. The unit according to claim 1, wherein the gas to be purified is corrosive.

10. The unit according to claim 1, wherein the gas to be purified is hydrogen chloride.

11. The unit according to claim 1 further comprising at least one filter for particulate material.

12. A gas purification unit suitable for purifying hydrogen chloride gas to a high purity before said gas is dispensed from a liquefied hydrogen chloride gas container having a valve assembly for discharging hydrogen chloride gas from the container, said unit comprising:

a hollow body having a first end and a second end and being at least partially filled between said ends with magnesium chloride on an amorphous carbon support;

a gas outlet provided at the first end of the body and adapted for connection to said valve assembly so that the body extends into the container; and gas inlet means permitting of gas flow from the container to the second end of the body, wherein the second end of the body is closed and the gas inlet means comprises conduit means within the body of the unit having a mouth at or near the first end of the body.

13. A valve assembly for the outlet of a liquefied gas container, said valve assembly comprising a valve housing for mounting said assembly in the container outlet, at least one gas flow path through the housing, a valve controlling gas flow through said path and a gas purification unit up stream of said gas flow path to purify gas admitted to said path from the container, said unit being as defined in claim 1.

14. A liquefied gas container system comprising a liquefied gas container having an outlet and a valve assembly mounted in the outlet of the container to control discharge of gas therethrough, said valve assembly being as defined in claim 13.

* * * * *